United States Patent [19]

Kitagawa et al.

[11] Patent Number: 4,518,956
[45] Date of Patent: May 21, 1985

[54] ELECTRIC LIQUID LEVEL DETECTOR

[75] Inventors: Junji Kitagawa; Shigeyuki Akita, both of Okazaki, Japan

[73] Assignee: Nippon Soken, Inc., Nishio, Japan

[21] Appl. No.: 366,387

[22] Filed: Apr. 7, 1982

[30] Foreign Application Priority Data

Apr. 13, 1981 [JP] Japan .................. 56-52783[U]

[51] Int. Cl.³ .............................................. G08B 21/00
[52] U.S. Cl. .................. 340/620; 73/304 C; 324/61 R; 340/59
[58] Field of Search ............... 340/620, 59; 73/304 C, 73/318, 304 R, 321; 324/61 R, 61 P, 61 QL

[56] References Cited

U.S. PATENT DOCUMENTS

| | | | |
|---|---|---|---|
| 3,774,238 | 11/1973 | Hardway, Jr. | 73/304 C X |
| 4,184,369 | 1/1980 | Jung et al. | 73/304 C |
| 4,209,740 | 6/1980 | Martha et al. | 73/304 C X |
| 4,316,174 | 2/1982 | Sutton et al. | 340/620 X |
| 4,322,713 | 3/1982 | Duck et al. | 340/620 X |

Primary Examiner—James L. Rowland
Assistant Examiner—Daniel Myer
Attorney, Agent, or Firm—Cushman, Darby & Cushman

[57] ABSTRACT

An electric liquid level detector of the condenser type comprises an electrode assembly including a pair of electrodes to be submerged into the oil within a liquid container, an electric circuit assembly provided with an electric detecting circuit for generating an output signal indicative of the level of remaining oil in dependence upon an electro-static capacity between the electrodes, and a flexible tubular guide member of conductive material fixed at its one end to the electrode assembly and at its other end to the electric circuit assembly. The guide member is provided therein with an elongated partition plate of conductive material grounded together with the guide member, and the electrodes are connected to the detecting circuit by means of a pair of insulated electric wires extending through a pair of elongated spaces subdivided by the partition plate in the guide member.

6 Claims, 3 Drawing Figures

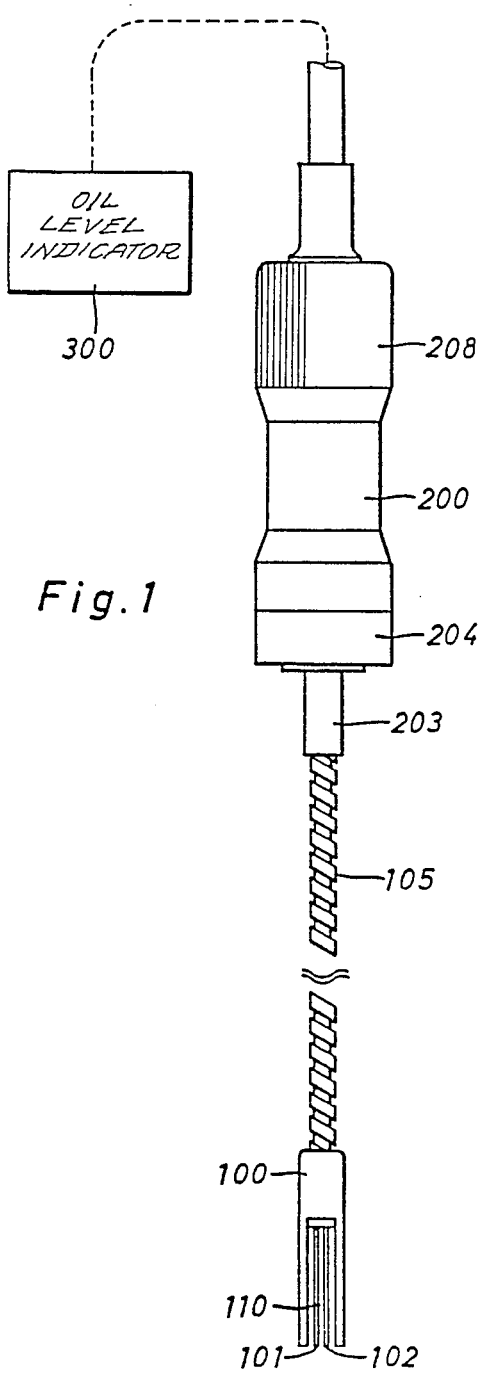
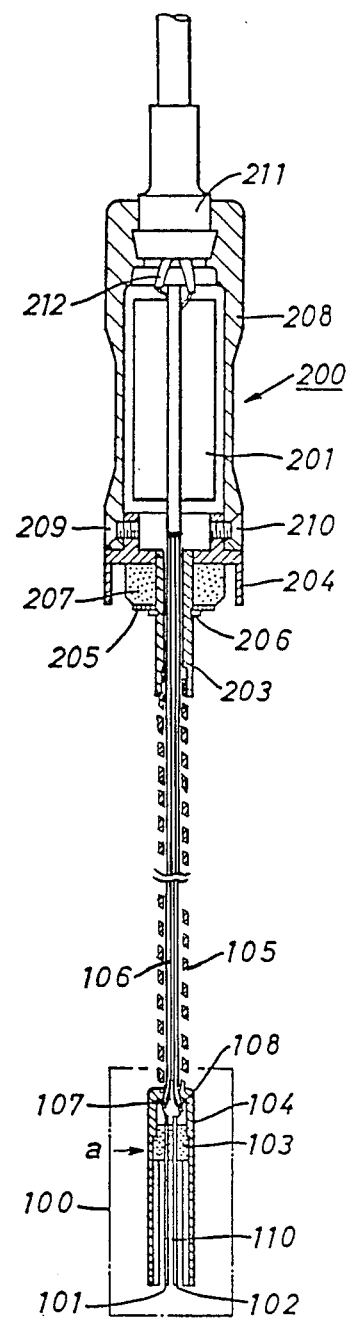

ELECTRIC LIQUID LEVEL DETECTOR

BACKGROUND OF THE INVENTION

The present invention relates to a liquid level detector, and more particularly to an electric liquid level detector of the condenser type for detecting the remaining quantity of oil stored within such an oil container as a torque converter casing in automotive vehicles.

In general, the remaining quantity of oil within a torque converter casing is detected by an oil level gauge in the form of an oil dip-stick which is indicated at its lower portion with full and lower level marks F and L. In use of the oil dip-stick, it is required to remove the oil dip-stick from the oil-filler pipe of the casing and to wipe away the oil adhered to its lower end portion with waste cloth. The oil dip-stick is inserted again into the oil-filler pipe to submerge its lower end portion into the stored oil thereby to confirm the level of oil adhered to its lower end portion. Such manipulation is troublesome, and the operator will soil his hand with the oil adhered to the oil dip-stick.

SUMMARY OF THE INVENTION

It is, therefore, a primary object of the present invention to provide an electric liquid level detector of the condenser type which is capable of electrically detecting the level of remaining liquid within a liquid container and indicating the detected level of remaining liquid by an indicator without such manipulation as required in use of the conventional oil dip-stick.

Another object of the present invention is to provide an electric liquid level detector of the condenser type which is capable of accurately detecting the level of remaining liquid within a liquid container without any undesired influences caused by vibration and change of the ambient temperature.

A further object of the present invention is to provide an electric liquid level detector of the condenser type in which an oscillator circuit of the resistance capacity type is arranged to generate an output signal indicative of the level of remaining liquid in dependence upon an electro-static capacity between a pair of electrodes submerged into the liquid.

A still further object of the present invention is to provide an electric liquid level detector of the condenser type in which a flexible tubular guide member is provided to connect the electrodes to the oscillator circuit so as to facilitate insertion of the electrodes into the liquid-filler pipe of the liquid container.

According to the present invention, the above objects are accomplished by provision of an electric liquid level detector of the condenser type for detecting the level of remaining liquid within a liquid container, which comprises an electrode assembly including a pair of electrodes arranged to be submerged into the liquid within the container, a flexible tubular guide member of conductive material fixed at its one end to the electrode assembly and being provided therein with an elongated partition plate of conductive material which is arranged to subdivide the interior of the guide member into a pair of elongated spaces, the guide member and partition plate being grounded, an electric circuit assembly fixed to the other end of the guide member and being provided with an electric detecting circuit for generating an output signal indicative of the level of remaining liquid in dependence upon an electro-static capacity between the electrodes, and a pair of insulated electric wires extending through the subdivided spaces in the guide member respectively for connecting the electrodes to the electric detecting circuit.

BRIEF DESCRIPTION OF THE DRAWINGS

Additional objects and advantages of the present invention will be more readily apparent from the following detailed description of a preferred embodiment thereof when taken together with the accompanying drawings, in which:

FIG. 1 is an elevational view of an electric liquid level detector in accordance with the present invention;

FIG. 2 is a sectional view of the detector of FIG. 1; and

DESCRIPTION OF THE PREFERRED EMBODIMENT

Figure 3:
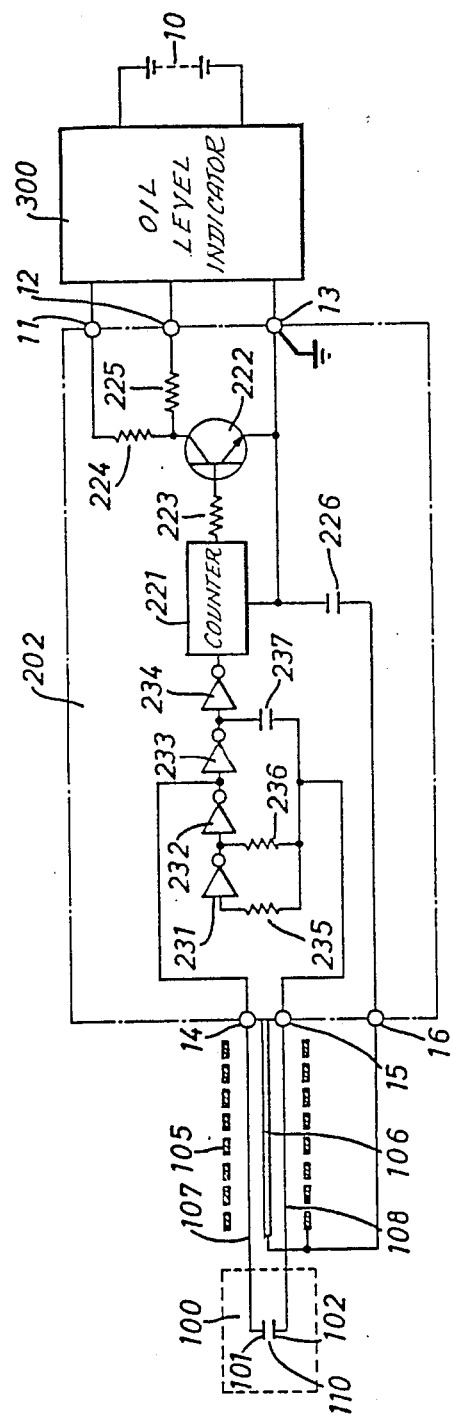
FIG. 3 is a diagram of an electric detecting circuit adapted to the liquid level detector shown in FIG. 1.

Referring now to the drawings, particularly in FIGS. 1 and 2, there is illustrated an electric liquid level detector in accordance with the present invention which includes an electrode assembly 100, an electric circuit assembly 200 and a tubular guide spring 105 fixed at its lower end to the electrode assembly 100 and at its upper end to the electric circuit assembly 200. The electrode assembly 100 includes a pair of electrodes 101 and 102 which are arranged to be submerged into the oil within a torque converter casing (not shown) for detecting the level of remaining oil. The electric circuit assembly 200 includes an oscillator circuit of the resistance capacity type which is connected to the electrodes 101, 102 by means of a pair of insulated electric wires 107, 108 extending through the guide spring 105. The oscillator circuit is arranged to oscillate at a frequency in dependence upon variation of the electro-static capacity 110 between the electrodes 101, 102. The oscillator circuit is also connected to an electric oil level indicator 300 which is located on an instrument panel in a vehicle compartment. As those of ordinary skill in the art will readily appreciate, the electric oil level indicator 300 can be of the type disclosed in U.S. Pat. No. 4,344,293 issued on Aug. 17, 1982.

As can be well seen in FIG. 2, the electrodes 101 and 102 are made of copper alloy and arranged parallel to each other with a small gap. The electrodes 101, 102 are also pressedly inserted at one end thereof into a holder 103 of such insulating material as bakelite, which holder 103 is fastened by caulking at a point a to secure the electrodes 101, 102 in place. The holder 103 is inserted into an electrode cover 104 which is fixed by brazing to the tubular guide spring 105 at its head. The tubular guide spring 105 is made of an elongated metallic plate which is helically coiled to provide flexibility and resiliency of the guide spring 105. An elongated partition plate 106 of conductive material is arranged within the tubular guide spring 105 to subdivide the interior of guide spring 105 into a pair of elongated spaces. The insulated wires 107 and 108 extend through the subdivided spaces in guide spring 105 respectively and are connected at one end thereof with the electrodes 101 and 102.

A guide pipe 203 is fixed by brazing at its one end to the upper end of guide spring 105 and at its other end to a plug 204 which is arranged to close a housing 208 for the electric circuit assembly 200 and is fixed in place by screws 209, 210 threaded into the housing 208. A sealing rubber block 207 is secured to the bottom face of plug 204 by means of a stopper plate 205 which is supported by a retainer clip 206 fixed to the guide pipe 203. The rubber block 207 is arranged to detachably close in a liquid-tight manner the opening of an oil-filler pipe of the torque converter casing. The electric circuit assembly housing 208 is rouletted at its outer periphery for facilitating manual operation of the detector assembly, which contains therein a print board 201 on which an electric detecting circuit 202 of FIG. 3 is deposited. A plastic cord-bush 211 is attached to the upper end of housing 208 to protect lead wires 212 extending from the deposited detecting circuit.

In FIG. 3, the electric detecting circuit 202 is connected to an electric power source 10 in the form of a vehicle battery by way of the oil level indicator 300. The electric detecting circuit 202 includes the oscillator circuit which is connected at its input terminals 14 and 15 to the electrodes 101 and 102 of the electrode assembly 100 through the insulated wires 107 and 108. The guide spring 105 and partition plate 106 are connected to a terminal 16 which is grounded through a condenser 226. The oscillator circuit comprises a first inverter 231 connected at its input terminal to a resistor 235, a second inverter 232 connected at its input terminal to the output terminal of first inverter 231 and a resistor 236 and at its output terminal to the input terminal 14, a third inverter 233 connected at its input terminal to the output terminal of second inverter 232 and at its output terminal to one end of a condenser 237, and a fourth inverter 234 connected at its input terminal to the output terminal of third inverter 233. The fourth inverter 234 is connected at its output terminal to a binary counter 221 of TC 4024 type of Tokyo Shibaura Electric Co. Ltd. which is connected to the condenser 226 and to the base of a transistor 222 through a resistor 223. The transistor 222 is connected at its collector to a source terminal 11 and an output terminal 12 through resistors 224 and 225 respectively, and the emitter of transistor 222 is connected to an earth terminal 13.

In such an arrangement, the elongated partition plate 106 acts to prevent undesired changes of the distributed capacity between insulated electric wires 107, 108 caused by vibration and change of the ambient temperature. If the insulated electric wires 107, 108 extend through the tubular guide spring 105 without provision of the elongated partition plate 106, the distance between wires 107, 108 will change by vibration applied thereto to cause a change in the distributed capacity between the wires. This results in a change in the electro-static capacity value to be applied to the input terminals 14, 15 and results in a change in the oscillation frequency of the oscillator circuit. When the ambient temperature changes under the above condition, the dielectric constant of the insulating layer of wires 107, 108 changes, to cause a change in the distributed capacity between wires 107, 108. This also results in a change in the electro-static capacity value to be applied to the input terminals 14, 15 and results in a change in the oscillation frequency of the oscillator circuit. For the purpose of eliminating the undesired phenomena described above, the insulated wires 107, 108 are arranged within the respective spaces subdivided by the partition plate 106 in guide spring 105. It is also noted that the flexibility of tubular guide spring 105 serves to facilitate insertion of the electrode assembly 100 through a bent portion of the oil-filler pipe and that the partition plate 106 is grounded together with guide spring 105 to protect the wires 107, 108 from external noises.

In use of the liquid level detector, the electrode assembly 100 is inserted into the torque converter casing through its oil-filler pipe, and the plug 204 is coupled over the opening of the oil-filler pipe such that the sealing rubber block 207 closes in a liquid-tight manner the oil-filler pipe. Assuming that in operation the level of oil stored within the casing is below a predetermined minimum level, the electrodes 101, 102 may not be submerged into the oil and are located in the air with dielectric constant of 0.1. Under such a condition, the oscillator circuit oscillates at a high frequency as well as operation of a well-known ring oscillator because the electro-static capacity between electrodes 101, 102 is less than that of the condenser 237. Then, the binary counter 221 is applied at its clock terminal with the output signal of the oscillator circuit to generate pulse signals at a high frequency at its seventh output terminal $Q_7$, and the transistor 222 generates an output signal at its collector in response to the pulse signals from binary counter 221. Thus, the oil level indicator 300 detects the fact that the oscillation frequency of the output signal is higher than a predetermined value, and an alarm lamp of the indicator 300 is activated to indicate a shortage of the remaining oil within the casing.

When the torque converter casing is supplied with fresh oil, the electrodes 101, 102 are submerged into the oil with dielectric constant larger than that of the air. This increases the electro-static capacity between electrodes 101, 102 in accordance with the increase of the oil. When the casing is filled with fresh oil, the electro-static capacity between electrodes 101, 102 becomes substantially equal to that of condenser 237. As a result, the oscillation frequency of the oscillator circuit becomes lower than that under shortage of the remaining oil. Then, the binary counter 221 generates pulse signals at a low frequency at its seventh output terminal $Q_7$ in response to the output signal from the oscillator circuit, and the transistor 222 generates an output signal at its collector in response to the pulse signals from binary counter 221. Thus, the oil level indicator 300 detects the fact that the oscillation frequency of the output signal is lower than the predetermined value, and the alarm lamp disappears to indicate the sufficiency of the oil within the casing.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. An electric liquid level detector of the condenser type for detecting the level of remaining liquid within a liquid container, comprising:
   an electrode assembly including a pair of electrodes arranged to be submerged into the liquid within said container;
   a flexible tubular guide member of conductive material fixed at its one end to said electrode assembly and being grounded;
   an elongated flexible partition plate of conductive material fixed at its one end to said electrode assembly and arranged within said guide member to subdivide the interior of said guide member into a pair of elongated spaces, said flexible partition plate being grounded;

an electric circuit assembly fixed to the other ends of said guide member and said flexible partition plate respectively and being provided with an electric detecting circuit for generating an output signal indicative of the level of remaining liquid in dependence upon an electrostatic capacity between said electrodes; and a pair of insulated electric wires extending through the subdivided spaces in said guide member respectively for connecting said electrodes to said electric detecting circuit.

2. An electric liquid level detector as claimed in claim 1, wherein said flexible tubular guide member comprises an elongated metallic plate which is helically coiled in the form of a tubular pipe to contain said partition plate therein.

3. An electric liquid level detector as claimed in claim 1 or 2, wherein said electric detecting circuit includes an oscillator circuit of the resistance capacity type connected to said electrodes through said insulated electric wires for oscillating in dependence upon the electrostatic capacity between said electrodes.

4. An electric liquid level detector as claimed in claim 1 or 2, wherein said electrode assembly includes an electrode cover having an opening at one end and at its other end being fixed to the one ends of said tubular guide member and said flexible partition plate, said electrode cover containing said electrodes therein.

5. An electrid liquid level detector as claimed in claim 1, wherein said electric circuit assembly includes a closed housing fixed to the other end of said guide member, and a print board assembled within said housing for providing thereon said electric detecting circuit, said print board being fixed to the other end of said flexible partition plate.

6. An electric liquid level detector as claimed in claim 5, wherein said housing is provided with a plug to be coupled over an opening of said liquid container, and a sealing rubber block fixed to the bottom face of said plug to close in a liquid-tight manner the opening of said liquid container.

* * * * *